(12) United States Patent  (10) Patent No.: US 8,750,903 B1
Fitzsimmons et al.  (45) Date of Patent: Jun. 10, 2014

(54) CELL PHONE CONTROL AND LOCALIZATION FOR RESTRICTED FACILITIES

(75) Inventors: Daniel Fitzsimmons, Boca Raton, FL (US); Howard Melamed, Coral Springs, FL (US)

(73) Assignee: CellAntenna Corporation, Coral Springs, FL (US)

( * ) Notice: Subject to any disclaimer, the term of this patent is extended or adjusted under 35 U.S.C. 154(b) by 109 days.

(21) Appl. No.: 13/432,575

(22) Filed: Mar. 28, 2012

Related U.S. Application Data

(60) Provisional application No. 61/604,067, filed on Feb. 28, 2012.

(51) Int. Cl.
*H04W 24/00* (2009.01)
*H04W 4/00* (2009.01)

(52) U.S. Cl.
USPC ............. 455/456.4; 455/432.1; 455/426.1

(58) Field of Classification Search
USPC .......... 455/445, 426.1, 432.1, 432.3, 435.1, 455/435.2, 435.3, 456.4
See application file for complete search history.

(56) References Cited

U.S. PATENT DOCUMENTS

| | | | |
|---|---|---|---|
| 4,723,311 A | 2/1988 | Moustakas et al. | |
| 4,727,537 A | 2/1988 | Nichols | |
| 4,825,435 A | 4/1989 | Amundsen et al. | |
| 4,990,814 A | 2/1991 | Tanski et al. | |
| 5,568,476 A | 10/1996 | Sherer et al. | |
| 5,884,040 A | 3/1999 | Chung | |
| 6,442,168 B1 | 8/2002 | Vasa | |
| 7,236,766 B2 * | 6/2007 | Freeburg | 455/404.1 |
| 7,339,981 B2 | 3/2008 | Dogan | |
| 7,853,261 B1 * | 12/2010 | Lewis et al. | 455/445 |
| 8,204,494 B2 * | 6/2012 | Weinzierl | 455/419 |
| 2001/0033600 A1 | 10/2001 | Yang et al. | |
| 2003/0174763 A1 | 9/2003 | Kouki | |
| 2004/0166878 A1 * | 8/2004 | Erskine et al. | 455/456.1 |
| 2004/0203748 A1 * | 10/2004 | Kappes et al. | 455/432.1 |
| 2006/0063485 A1 | 3/2006 | Gainey et al. | |
| 2007/0099667 A1 | 5/2007 | Graham et al. | |
| 2007/0285280 A1 * | 12/2007 | Robinson et al. | 340/928 |
| 2009/0061870 A1 * | 3/2009 | Finkelstein et al. | 455/435.2 |
| 2011/0002687 A1 | 1/2011 | Sabat, Jr. et al. | |
| 2012/0322459 A1 * | 12/2012 | Jaffri et al. | 455/456.1 |

* cited by examiner

*Primary Examiner* — Christopher M Brandt
(74) *Attorney, Agent, or Firm* — Malloy & Malloy, P.L.

(57) ABSTRACT

A method and system for controlling cell phones and cellular phone system based wireless devices in a restricted environment, such as prisons, where the control system makes use of software defined radios to mimic the ambient wireless signals transmitted from nearby cell phone base stations. The system produces a multi-protocol beacon set based on the existing wireless environment and a pre-determined logic set to accomplish complete coverage of all relevant cell phone operating protocols. Cell phones within the desired target coverage area are then attracted to the system and their operation can be controlled. The cell phone control system is able to selectively deny or permit calls based upon a whitelist/blacklist database. The cell phone control system is interfaced to a distributed system of antennas in order to provide the proper control needed over the coverage area.

15 Claims, 6 Drawing Sheets

PROCESSING STEPS
FOR LOCALIZATION

FIG. 1

PROCESSING STEPS OF
THE PRESENT
INVENTION

FIG. 2

MAJOR COMPONENTS
OF THE PRESENT
INVENTION

FIG. 3

COMPONENT INTERCONNECTION OF
THE PRESENT INVENTION

FIG. 4

HEADEND COMPONENT
INTERCONNECTION OF THE
PRESENT INVENTION

FIG. 5

PROCESSING STEPS
FOR LOCALIZATION

FIG. 6

CELL PHONE CONTROL AND LOCALIZATION FOR RESTRICTED FACILITIES

CLAIM OF PRIORITY

The present application is based on and a claim of priority is made under 35 U.S.C. Section 119(e) to a provisional patent application that is currently in the U.S. Patent and Trademark Office, namely, that having Ser. No. 61/604,067 and a filing date of Feb. 28, 2012, and which is incorporated herein by reference in its entirety.

BACKGROUND OF THE INVENTION

1. Field of the Invention

The present invention relates to cell phone control systems deployed in environments where inhibiting or controlling wireless device communications is desired and further relates to cell phone controllers that inhibit or control wireless mobile communication devices including cell phones, two way radios, smart phones, personal digital assistants, and wireless enabled computers and devices.

2. Description of the Related Art

Wireless communication devices such as cell phones have become increasingly ubiquitous. At times, it is desirable to block or control wireless communications in access areas such as the areas within prison facilities where inmates are housed.

Cell phone controllers are known in the art and are utilized by government agencies with the legal authority to permit or deny usage of the wireless frequency spectrum. Such controllers can operate in a mode where communication is permitted on a select basis based on a cell phones identification numbers or they can operate in a fashion where all cell phone communication is blocked for an entire target area. Another example of cell phone controller operation is where all communication is permitted and the cell phones within the target coverage area are simply identified by the system for later action. Such later action can include a search of the premises for the identified cell phones and/or reporting the identity of the cell phone to the cell phone carriers. Upon receiving a report, contacted cell phone carriers are able to permanently disable a reported cell phone and any associated SIM cards.

Cell phone controllers typically comprise a set of software defined radios interfaced to a processor based control system. The system operates by scanning the ambient wireless environment for signals emanating from nearby cell phone base stations. From the scanning process, the cell phone controller is able to determine the carriers present, the frequencies utilized, and the protocols that are capable of serving the target area. Based on this information, a beacon signal set is created by the cell phone controller. The beacon signal set includes a beacon for each carrier, frequency band, and protocol resident in the target area. A beacon is a signal which is transmitted from a cell phone base station that contains control and identification information from the tower. A beacon which is of the same carrier, frequency band, and protocol which is adequate and sufficiently stronger than the competing beacons in a target area will attract cell phones to register and communicate with the stronger beacon and associated base station or cell phone controller.

Thus, the cell phone controller acts as a multi-protocol, multi-frequency band, multi-carrier base station. This has the benefit of reducing the quantity of equipment needed by combining multiple radios into a single software defined radio and multiple software defined radios into a single system controlled by a single controller. This reduces the cost of such a system greatly. Although the reduction in cost of such a system is beneficial, a method and system to reduce the beacon set required for a given ambient signal environment would have the benefit of further reducing the costs and complexity of deployment.

Cell phone controllers have been described in the prior art that utilize an analog connection to the public switched telephone network or to the resident inmate phone system. Such a connection permits an intercepted cell phone call to be completed by the system by patching the call through to the public telephone network. Although such a connection is helpful, a system that includes a directly connected digital interface in which no analog to digital conversions are necessary would be beneficial in permitting communication to an Internet Protocol (IP) based Private Branch Exchange (PBX) or inmate phone system while at the same time reducing the cost and complexity of the sub-system.

U.S. patent application Ser. No. 13/399,688 (Wireless Communication Device Controller with Improved Coverage Area Control) describes a method in which a cell phone controller is interfaced to a distributed system of antennas in order to confine and control the coverage area. With such a system, it would be beneficial for there to be a method of localizing cell phones that are found within the coverage area. Such a method would be helpful in determining the source of a potential breach in security.

SUMMARY OF THE INVENTION

This invention is directed to a method and system for controlling cell phones and related wireless devices in access restricted environments such as prisons where the system makes use of software defined radios to mimic the ambient wireless signals transmitted from the nearby cell phone base stations. The system produces a multi-protocol beacon set based on the existing wireless environment and a pre-determined logic set to accomplish complete coverage of all relevant protocols. Cell phones within the desired target area are then attracted to the system and the operation of the attracted cell phones can be controlled. The cell phone control system is able to selectively deny or permit calls based upon a whitelist/blacklist database. Permitted calls are routed to the public switched telephone network via an IP based interface. The interface connects the cell phone control system to either an inmate phone system or directly to a PBX.

The cell phone control system is interfaced to a distributed system of antennas in order to provide the proper control needed over the coverage area. The position within the facility of the cell phones can be determined by the use of an RF detector circuit interfaced to each headend port of the system. The data produced by the detector circuit is correlated via the use of a time stamp.

An advantage of the present invention over prior art is that it minimizes the number of software defined radios required for the system to provide complete coverage of all protocols. The software defined radios are the most expensive components of the system.

Another advantage of the present invention over prior art is that by providing an IP based interface to either the inmate phone system or private branch exchange, the costs of the overall system are reduced. IP based inmate phone systems and private branch exchange systems have an inherently lower cost of deployment and ownership than earlier developed analog based systems.

Yet another advantage of the present invention over prior art is that it provides a simple and reliable method to determine the location of cell phones which have been attracted to the system.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
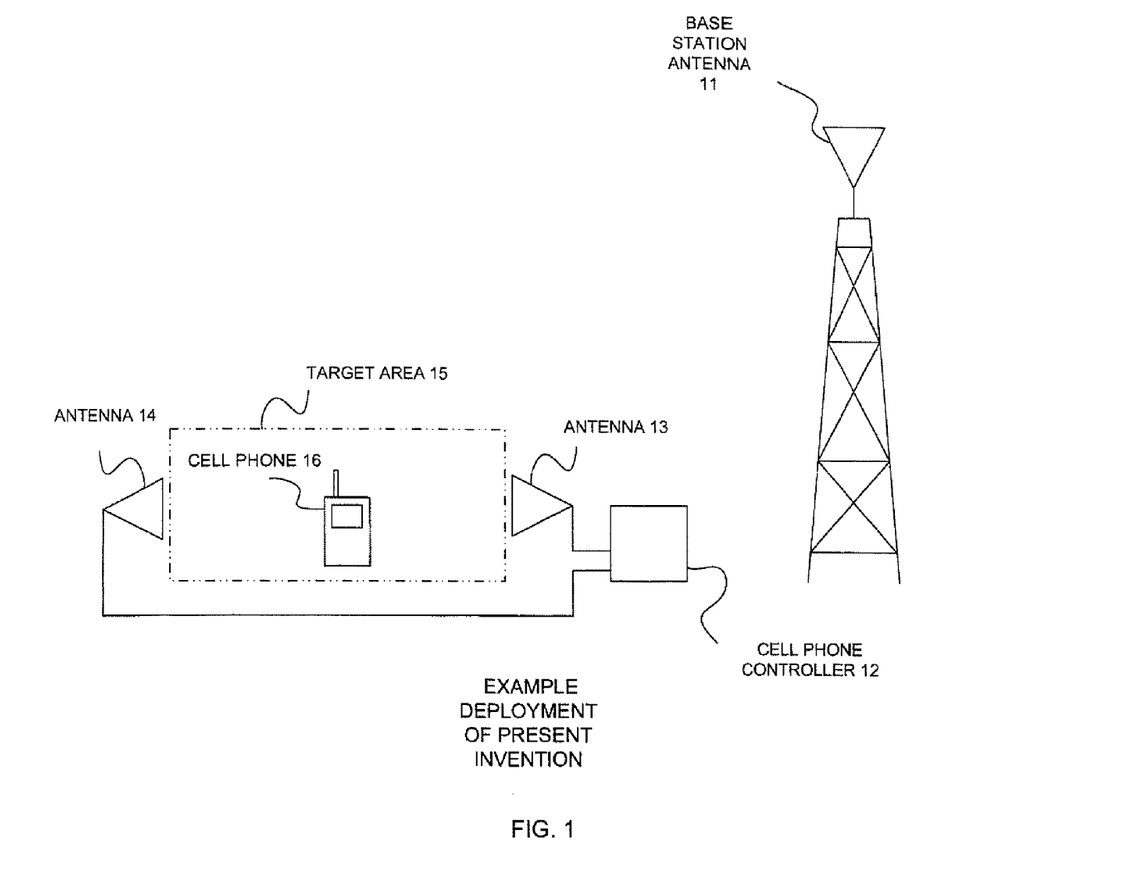
FIG. 1 is a schematic representation in block diagram form of an example deployment of the present invention.

FIG. 1 is a schematic representation in block diagram form of a very simple embodiment of the present invention. This embodiment includes cell phone controller 12 interfaced to Antenna 13 and Antenna 14 via coaxial cable or an alternative RF transmission means to define a target Coverage Area 15. Cell Phone 16 is shown inside the target area and is representative of a possible plurality of cell phones within the target area. A single Base Station Antenna 11 resides outside the coverage area.

Figure 2:
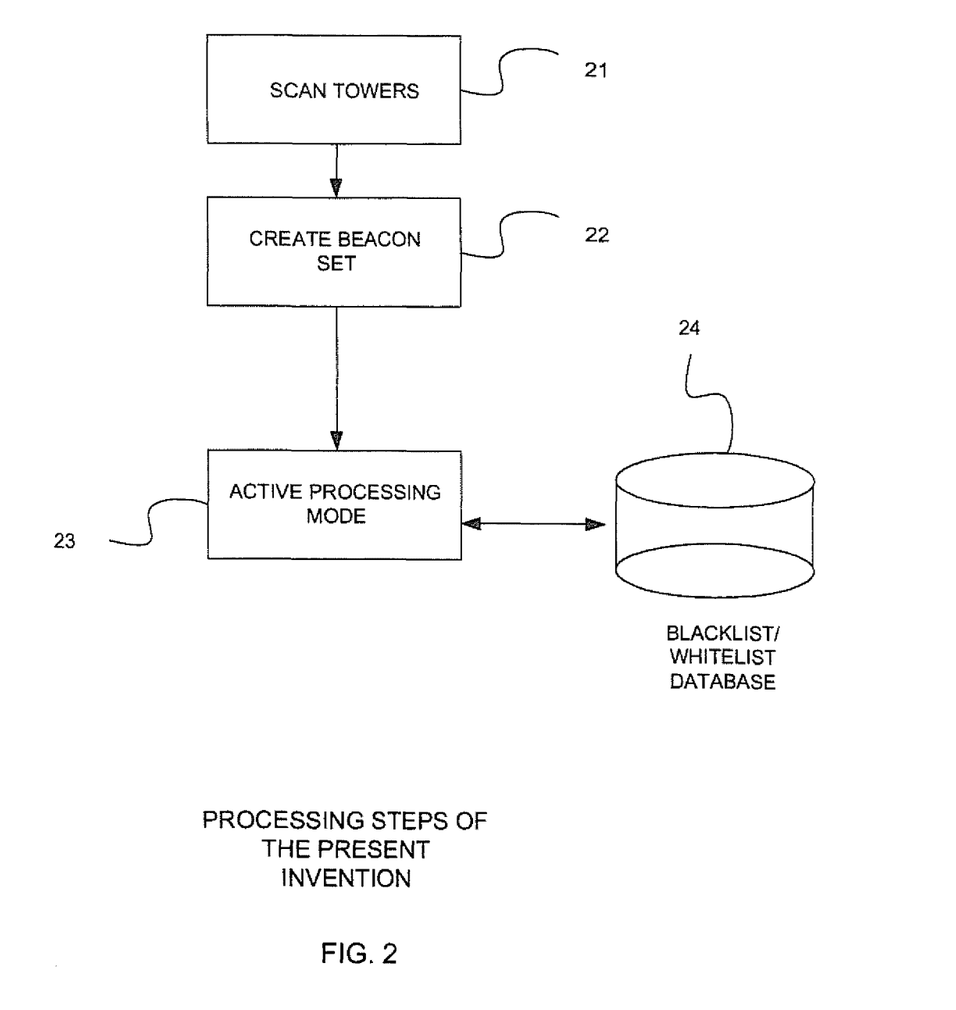
FIG. 2 is a schematic representation in block diagram form of the processing steps of the present invention.

FIG. 2 is a schematic representation in block diagram form of the major processing steps taken by the present invention. The sequence is initiated by the Scan Towers 21 processing step in which the cell phone controller scans for all cell phone base station beacon or pilot signals which can be found at the location of the system. Each cell phone base station produces at least one beacon signal on a near continuous basis. This signal is sometimes referred to as a pilot signal. The Scan Towers 21 process collects the identification and control information on all beacons signals that can be received. FIG. 1 illustrates the simple case of a single tower and single antenna representing a single base station and accompanying beacon. In most cases, there will be numerous towers and base stations, each with multiple antennas and each antenna would support a different beacon.

From the collected tower or beacon data, the cell phone control system then creates an appropriate beacon set as represented by the Create Beacon Set 22 process of FIG. 2. A beacon is created by the cell phone controller for each frequency band, cell phone carrier (company that provides the cell phone service), and wireless protocol combination in the set of beacon data collected from the surrounding towers. This processing is performed by the central processor of the cell phone controller. During this process, a rules database, stored within the non volatile memory of the cell phone controller processor is accessed and utilized. The rules database instructs the processor on methods to reduce the number of beacons required to provide complete coverage for all beacon combinations. For example, a communications carrier may provide beacons in an area on both the 1900 PCS and 850 MHz Cellular frequency bands but instructs cell phones to always migrate to the 1900 PCS band beacon if the signal is higher. In this case, only the 1900 beacon would be needed. Beacons are produced on un-used frequency bands in order to avoid conflict or interference to adjacent cell phone base stations. Wireless protocols include all current cell phone protocols such as AMPS, GSM, CDMA, WCDMA, and iDen, future variants of these protocols, and other future cellular protocols.

After the beacon set is created, the Active Processing Mode 23 processing step is then initiated. In this case the Base Station Antenna 11 would normally provide the ambient signals utilized by cell phones in the area. The cell phone control system operates by producing a higher level of signal power than this ambient signal. This results in the cell phones within the target area logically attaching themselves to the cell phone control system which is producing the highest beacon signal.

During Active Processing Mode 23, when a cell phone logically attaches itself to the cell phone controller, the identification information associated with the cell phone is collected and this information is compared against the Blacklist/Whitelist Database 24 as shown in FIG. 2. The blacklist/whitelist database contains information that indicates whether or not a cell phone is allowed to complete a call.

Figure 3:
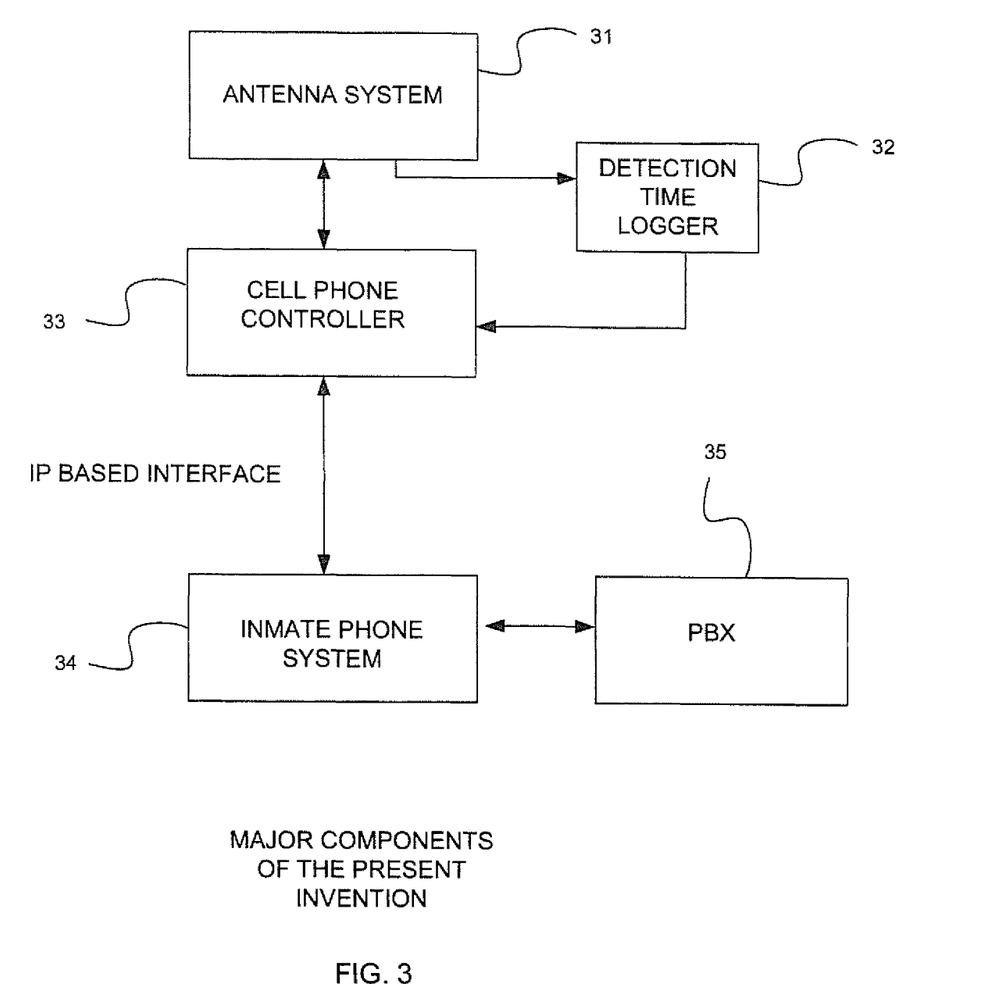
FIG. 3 is a schematic representation in block diagram form of the major components of the present invention.

FIG. 3 illustrates an embodiment of the present invention in which a Time Detection Logger 32 is utilized. The time Detection Logger function is used to determine the location of a cell phone within the target coverage area. This function is explained in further detail in the forthcoming FIG. 5 discussion.

FIG. 3 also illustrates the use of an IP based interface to a restricted target area pone system including an Inmate Phone System 34. Inmate phone systems are known to the prior art and provide telephone service to prison inmates on a controlled basis. Inmate Phone Systems connect to a predetermined phone system including the public switched telephone network either directly or though a private branch exchange system. The Internet Protocol (IP) based interface of the Cell Phone Controller 33 can either interface to a predetermined phone system including the Inmate Phone System as shown in FIG. 3 or alternatively interface directly to another predetermined phone system including the private branch exchange (PBX) 35. Prior art cell phone control system interfaces to the public switched telephone network are analog in design. An IP based interface has the advantage of enabling lower cost IP based equipment to be used without the addition of analog to digital conversion circuitry.

Figure 4:
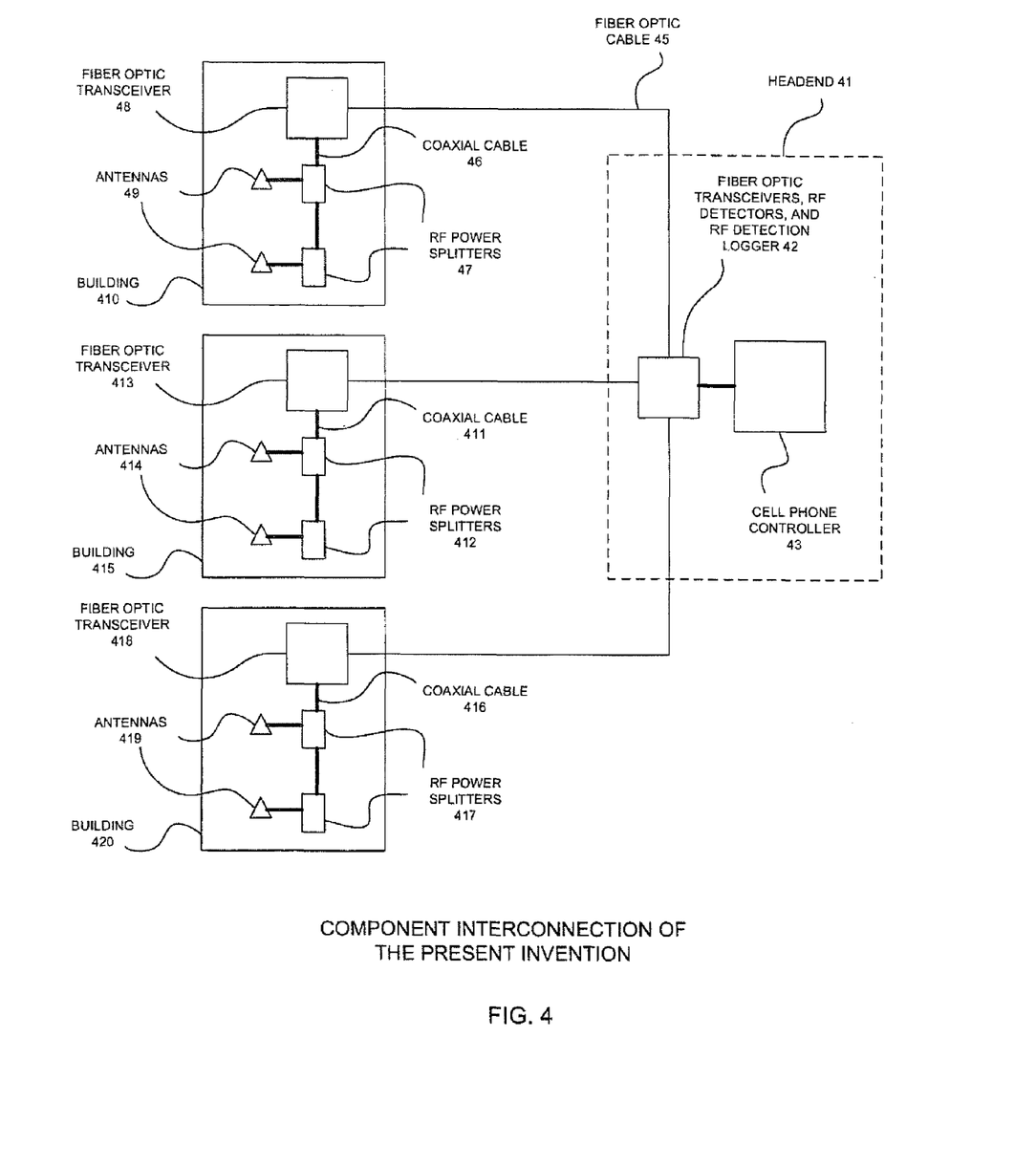
FIG. 4 is a schematic representation in block diagram form of the component interconnection of the present invention.

FIG. 4 shows a simple embodiment of the present invention in which coverage is provided in three separate buildings, namely Building 410, Building 415, and Building 420. This embodiment makes use of a fiber optic based distributed antenna system, such as described in U.S. patent application Ser. No. 13/399,688 (Wireless Communication Device Controller with Improved Coverage Area Control) incorporated herein by reference. With this type of system, the Cell Phone Controller 43, communicates via a fiber optic transceiver set to the system of antennas installed in selected locations throughout the coverage area. The Cell Phone Controller 43 and adjacent Fiber Optic Transceivers, RF detectors, and RF Detection Logger 42 are co-located. This co-located equipment along with any associated co-located equipment are collectively referred to as the Headend 41 of the system. The headend is typically located in a secure building which is separate from the coverage buildings 410, 414, 420.

FIG. 4 shows the Fiber Optic Cable 45 which connects the Headend Fiber Optic Transceiver 41 to the Fiber Optic Transceivers 48, 413, and 418 located in the target buildings. Fiber Optic Transceivers 45, 48, 413, and 418 provide the conversion from optical energy to RF energy and vise versa. Fiber Optic Transceivers 48, 413, and 418 connect to Coaxial Cable 46, 411, and 416 which in turn provide power to and from Antennas 49, 414, and 419 via RF Power Splitters 47, 412, and 417.

The exact arrangement of the antennas and interconnection between the antennas is dependent upon the design of the target facility and is engineered on a case by case basis. In the case of FIG. 4 the facility and system design is relatively simple. The interconnection means between the major system components can be comprised of optical fiber, coaxial cable, twisted pair, or a combination of the three cable types.

In each case, the RF power splitters are chosen to provide the correct proportion of power required to the antennas and cable segments that interface to each power splitter. The power level settings of the communications device controller and fiber optic transceivers are also set as to provide the proper power levels required.

Figure 5:
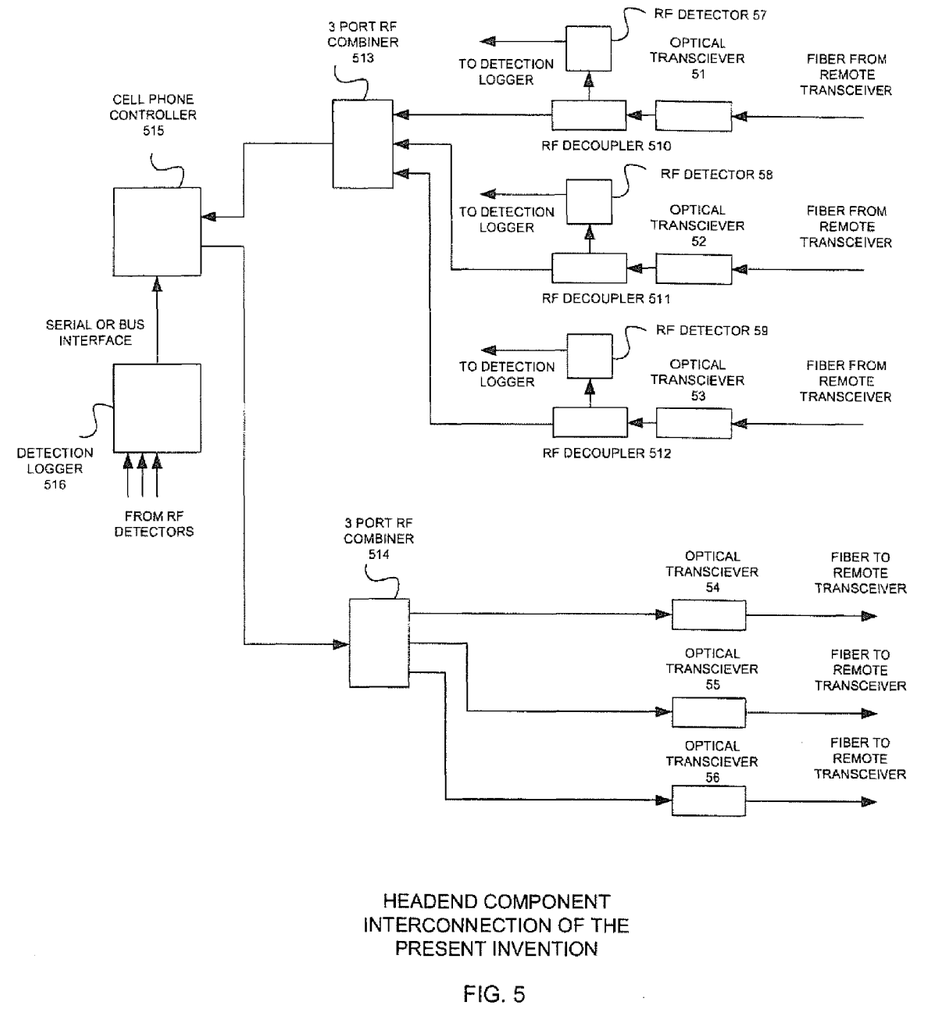
FIG. 5 is a schematic representation in block diagram form of the headend interconnection of the present invention.

FIG. 5 shows greater detail of the components of the headend of the present invention. In this case, the fiber optic cables coming to and from each of the three buildings have separate fiber strands for transmitting and receiving. The three fibers transmitting in the direction of from the target buildings to the headend are interfaced to Optical Transceivers 51, 52, and 53. These three Transceivers connect via RF coaxial cable to RF Decouplers 510, 511, and 512. These three decouplers provide a subset of RF power such as −10 dB to RF Detectors 57, 58, and 59. These RF detectors are well known to the art and can be comprised of Minicircuits model ZX47-60-S+ or a similar circuit. The RF decouplers also pass through the majority if the power to 3 Port Combiner 513 which combines the three signals. The combined signals are then fed into the Cell Phone Controller 515.

The RF detectors operate in a fashion where the RF input creates a proportional analog signal output. This analog signal output is fed into the Detection Logger 516 shown in FIG. 5. The detection logger comprises a plurality of analog inputs with one input circuit dedicated to each of the three RF detector signals.

FIG. 5 also shows the RF output circuit from the Cell Phone Controller which is includes 3 Port Combiner 514 which feeds Optical Transceivers 54, 55, and 56, which in turn feed the three fiber strands leading to each of the three target buildings.

It should be noted that FIG. 5 represents a simple implementation. The majority of implementations involve the use of many antennas and associated RF distribution hardware. Typically filters are required as part of the RF distribution system in order to eliminate interference and to combine and split the frequency bands in use.

Figure 6:
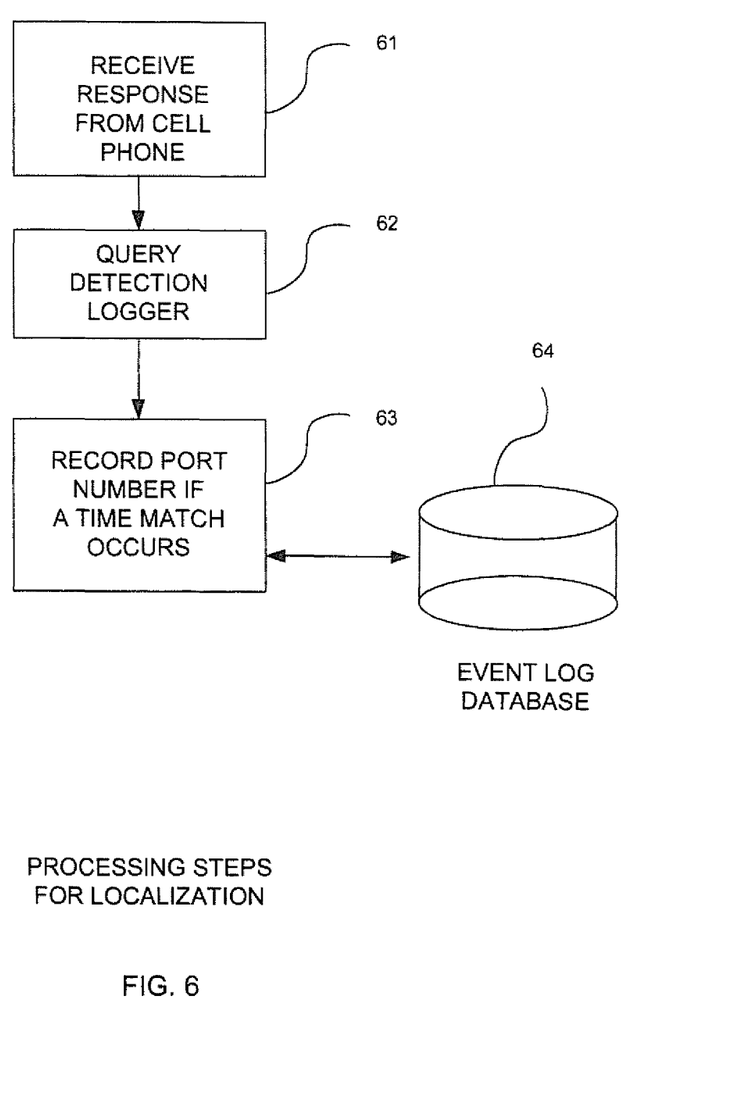
FIG. 6 is a schematic representation in block diagram form of the processing steps for localization of the present invention.

FIG. 6 shows the processing steps utilized when the location of a cell phone is to be determined. When a response signal is received from a cell phone as illustrated by the Receive Response From Cell Phone 61 processing step, the cell phone controller will note the time of reception of the signal. The cell phone controller will then perform a query or read operation to the detection logger as illustrated by the Query Detection Logger 62 processing step. The cell phone controller will then perform the Record Port Number If A Time Match Occurs 63 processing step and record the information in the Event Log Database 64. This processing step involves comparing the time stamp of the received signal with the time and port number recorded by the detection logger. If a time match occurs within a predetermined threshold, the cell phone detection occurrence is associated with the port number recorded which is in turn associated with a predetermined location within the coverage area.

The afore described methods provides a new, accurate, and cost efficient method of determining the location of a cell phone present in the target coverage area.

Another advantage of the present invention is that it provides a method and system to reduce the cost and complexity of a deployment by reducing the number of beacons and associated equipment.

Yet another advantage of the present invention is that it provides for the use of less costly IP based inmate phone system and private branch exchange equipment.

While the present subject matter has been described in detail with respect to specific embodiments thereof, it will be appreciated that those skilled in the art, upon obtaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would readily apparent to one of ordinary skill in the art.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method of controlling wireless communication devices within a predetermined target area comprising:
    operating a cell phone controller to scan for base station beacon signals associated with the target area,
    collecting identification and control data of all detected base station beacon signals,
    creating a beacon set appropriate for all the base station beacon signals operative within the target area, attaching operation of cell phones within the target area to the cell phone controller by conducting an active processing mode,
    defining the active processing mode as producing a higher level of signal power by the cell phone controller than that of an ambient signal provided by the base station,
    providing a radio frequency (RF) detection apparatus, including time detection recording capabilities, to determine location of a cell phone within a target area,
    determining the location of a cell phone within the target area by receiving a response signal from the cell phone and determining the time therefore; and
    performing a query to a detection logger and recording port numbers when a time match of said time determined as a result of said response signal from the cell phone, occurs.

2. A method as recited in claim 1 further comprising utilizing a predetermined active rules database stored within the cell phone controller to reduce the number of beacons required to provide complete coverage of all beacon signal combinations within the target area.

3. A method as recited in claim 1 accessing a blacklist/whitelist database and comparing the identification and control data therewith for determining allowed cell phone calls from within the target area.

4. A method as recited in claim 3 completing the allowed cell phone calls utilizing an Internet Protocol interface to a predetermined phone system.

5. A method as recited in claim 4 defining the predetermined phone system as a restricted target area phone system.

6. A method as recited in claim 4 defining the predetermined phone system as a private branch exchange (PBX) system.

7. A method as recited in claim 1 further comprising comparing a time stamp indicative of the time match and associating the port number recorded with the time stamp.

8. A method as recited in claim 1 defining the beacon set as comprising each frequency band, cell phone carrier and wireless protocol combination in the collected base station beacon signals.

9. A system for controlling wireless communication within a predetermined target area, said system comprising:

- at least one communication device controller interactive with a plurality of antennas associated with the target area,
- a radio frequency (RF) detection apparatus, including time detection recording capabilities structured to determine location of communication devices within the target area by receiving response signals from the communication devices and determining the time of the response signals being received and to log an occurrence of time matches related to the time of the response signals,
- said one communication device controller further structured to detect ambient signals from at least one communications base station,
- said one communication device controller further structured to generate a higher level of signal power than that of said ambient signal; said higher level of signal power sufficient to attach operation of communication devices within the target area to the one communication device controller, and
- said one communication device controller structured to create a beacon set appropriate for coverage by the one communication device controller by all base station beacon signals operating within the target area.

10. A system as recited in claim 9 wherein said beacon set comprises each frequency band, cell phone carrier and wireless protocol combination in collected base station beacon signals.

11. A system as recited in claim 9 further comprising a blacklist/whitelist database including identification and control data of communication devices operating within the target area.

12. A system as recited in claim 11 further comprising an Internet Protocol interface connecting predetermined communication devices within the target area to a predetermined phone system for completion of communication from within the target area to an outside of the target area.

13. A system as recited in claim 12 wherein said predetermined phone system comprises a restricted target area phone system.

14. A system as recited in claim 12 wherein said predetermined phone system comprises a private branch exchange (PBX) system.

15. A system as recited in claim 9 further comprising a predetermined active rules database stored within said one communication device controller, said active rules database operative to reduce the number of beacons within said beacon set required to provide complete coverage of all beacon signal combinations within the target area.

* * * * *